US012812187B2

(12) United States Patent
Gupta et al.

(10) Patent No.: US 12,812,187 B2
(45) **Date of Patent: *Nov. 24, 2026**

(54) MULTISCREEN EXPERIENCE FOR PARALLEL PLAYBACK OF TIME SHIFTED LIVE STREAM CONTENT

(71) Applicant: Adeia Guides Inc., San Jose, CA (US)

(72) Inventors: Ashish Gupta, Bangalore (IN); Vaibhav Gupta, Bangalore (IN); Rohit Dhiman, Uttarakhand (IN)

(73) Assignee: Adeia Guides Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/074,206

(22) Filed: Mar. 7, 2025

(65) Prior Publication Data

US 2025/0211803 A1 Jun. 26, 2025

Related U.S. Application Data

(63) Continuation of application No. 18/384,333, filed on Oct. 26, 2023, now Pat. No. 12,273,569, which is a continuation of application No. 17/401,911, filed on Aug. 13, 2021, now Pat. No. 11,838,559, which is a continuation of application No. 17/107,249, filed on Nov. 30, 2020, now Pat. No. 11,122,325.

(51) Int. Cl.

| | |
|---|---|
| ***H04N 21/2187*** | (2011.01) |
| ***G06V 20/40*** | (2022.01) |
| ***H04N 21/231*** | (2011.01) |
| ***H04N 21/24*** | (2011.01) |
| ***H04N 21/414*** | (2011.01) |
| ***H04N 21/431*** | (2011.01) |
| ***H04N 21/858*** | (2011.01) |

(52) U.S. Cl.
CPC ......... *H04N 21/2187* (2013.01); *G06V 20/41* (2022.01); *G06V 20/42* (2022.01); *H04N 21/231* (2013.01); *H04N 21/2407* (2013.01); *H04N 21/41407* (2013.01); *H04N 21/4316* (2013.01); *H04N 21/8586* (2013.01)

(58) Field of Classification Search
CPC ............. H04N 21/2187; H04N 21/231; H04N 21/2407; H04N 21/41407; H04N 21/4316; H04N 21/8586; H04N 21/234381; H04N 21/4126; H04N 21/4334; H04N 21/440245; H04N 21/44209; H04N 21/84; H04N 21/8456; G06V 20/41; G06V 20/42
See application file for complete search history.

(56) References Cited

U.S. PATENT DOCUMENTS

| | | | | |
|---|---|---|---|---|
| 9,973,816 B2 * | 5/2018 | Crowe | ............... | H04N 21/4383 |
| 10,063,911 B1 * | 8/2018 | Obara | ................ | H04N 21/4223 |
| 2017/0332036 A1 * | 11/2017 | Panchaksharaiah | ..... | H04N 5/45 |

* cited by examiner

*Primary Examiner* — Oschta I Montoya
(74) *Attorney, Agent, or Firm* — HG Law LLP

(57) ABSTRACT

The present disclosure is generally directed to media systems configured to receive and play live media content. In particular, methods and systems are provided for a multi-screen content playback experience for time shifted live stream content. Systems and methods are provided herein for generating for display a catch-up video (e.g., a segment of a live stream stored as URLs on a local device during the time the live stream was interrupted) in a picture-in-picture (PIP) window, and generating the PIP catch-up window and the live window for simultaneous display.

20 Claims, 7 Drawing Sheets

MULTISCREEN EXPERIENCE FOR PARALLEL PLAYBACK OF TIME SHIFTED LIVE STREAM CONTENT

CROSS-REFERENCE TO RELATED APPLICATIONS

This application is a continuation of U.S. patent application Ser. No. 18/384,333, filed Oct. 26, 2023, which is a continuation of U.S. patent application Ser. No. 17/401,911, filed Aug. 13, 2021, now U.S. Pat. No. 11,838,559, which is a continuation of U.S. patent application Ser. No. 17/107,249, filed Nov. 30, 2020, now U.S. Pat. No. 11,122,325, the disclosures of which are hereby incorporated by reference herein in their entireties.

BACKGROUND

This disclosure is generally directed to media systems configured to receive and play live media content. In particular, methods and systems are provided for a multi-screen content playback experience for time shifted live stream content.

SUMMARY

Media programs, especially live broadcast programs such as sporting events, are prone to disruptions, for example, due to bandwidth issues or network connectivity. Disruptions in live streaming cause a user to miss portions of content of a live stream. Such interruptions are often not anticipated, and users are often not prepared during a live stream experience, resulting in an inability to view or review portions of the program that were missed. Live streaming, such as IPTV streaming, of media content is and has been one of the most popular types of content provided to users in modern entertainment. A major and coincidental issue with IPTV streaming is the issue of connectivity, potentially due to intermittent low network bandwidth. When it comes to live streaming, the aforementioned problems translate into major issues regarding user experience.

Traditionally, television sets used terrestrial or satellite signals to tune to a particular frequency channel to show the content to the users. However, with the advent of the internet and popularity of streamers, providers stream content directly to our internet-enabled devices through IPT technology. For example, a user may experience frustration when watching a live soccer match. As a user is watching a live soccer game, if the user is forced to be stuck on the infamous loading icon for long periods of time, lagging that occurs during live streaming of content causes serious frustration for the user. On top of that, what tends to raise the user's frustration level further is the live stream to shifting or jumping directly to the latest frame, i.e., the live frame, supposedly to continue the user's live streaming experience of the live action but evidently missing segments of content in the process.

Current methods and systems include either (a) automatically shifting the user's viewing experience to the latest frame of the live stream and skipping everything in between the period of disruption, i.e., skipping the frames missed during the disrupted period, or (b) some methods and systems may allow, in addition to (a) or alternatively, the user to continue his/her user experience of the buffered (or cached) portion of the live content, i.e., continuing consumption of the content from where the user had left off, or in other words at the point where disruption caused the live stream to start lagging. Typically, however, the user would eventually skip everything and tune back to the latest frame for the core reason that no one likes to be left behind the excitement during a live stream.

Thus, there is a need for methods and systems to provide a user experience to allow the user to continue viewing the live stream, i.e., live, as well as keeping the user caught up with the content that was missed due to lags during the live stream.

Accordingly, to overcome these problems, systems and methods are provided herein for generating for display a catch-up video (e.g., a segment of a live stream stored as URLs on a local device during the time the live stream was interrupted) in a picture-in-picture (PIP) window, and generating the PIP catch-up window and the live window for simultaneous display. Systems and methods described herein provide a display of the catch-up window that is configured to further provide a catch-up viewing experience that helps the user understand the missed portion of the live media session.

According to a first aspect, there is provided a method for generating a picture-in-picture catch-up window displaying a catch-up video with a live video window displaying a live video. The method comprises determining that a disruption has occurred to the live video. In response to determining that the disruption has occurred to the live video, the method initiates determining a period of disruption from the occurrence of the disruption until it is determined that the disruption has elapsed. Further, in response to determining that the period of disruption has elapsed, the method initiates storing a disrupted content segment of the live video that a user missed during the period of disruption. The method further comprises generating, if not already generated, the PIP catch-up window displaying the catch-up video displaying the disrupted content segment for simultaneous display with the live video window displaying the live video. The method further comprises detecting that the catch-up video has finished displaying the stored disrupted content segment and, in response to detecting that the catch-up video has finished displaying the stored disrupted content segment, discontinuing the generated PIP catch-up window.

In example embodiments, there are provided methods and systems for a dual-screen or multi-screen user experience during a live stream, more particularly for displaying a live stream and a catch-up video of the missed live content simultaneously, such that the user does not miss any of the live action. A media guidance application may be configured for generating the catch-up display.

In some embodiments, the step of determining the disruption has occurred comprises detecting that a connection to the live video has disconnected and wherein the step of determining that the disruption has elapsed comprises detecting that the connection to the live video has reconnected.

In some embodiments, the determining of the period of disruption is initiated after a threshold period of time. In some situations, for example, where the period of disruption is too short, the generating of the PIP catch-up window can be annoying to the user if constantly generated and discontinued. Thus, there may be provided a threshold period of time for which a lag is classified as a disruption.

In some embodiments, the simultaneous display of the live video window comprises displaying a latest timeframe of the live video. Assuming that upon proper reconnection that the live stream content skips to the latest frame, i.e., the live frame, there is corresponding skipped content that the user missed and that can be played back as part of the catch-up video in the PIP catch-up window.

In some embodiments, the step of storing the disrupted content segment of the live video comprises populating a HashMap of URLs associated with the disrupted content segment. For example, in response to determining that there has been a disruption of the live content, the media guidance application may begin storing data, e.g., URLs associated with the live video, in a local storage medium.

In some embodiments, the step of displaying the catch-up video comprises displaying an earliest disrupted content segment first when there is a plurality of disrupted content segments stored. Upon consecutive or subsequent time shifts in the live stream, the map will continue to populate the skipped segments of content and display to the user in a secondary screen, e.g., a PIP catch-up window, the earliest content segment that was missed by the user, e.g., the skipped segment corresponding to the earliest disruption.

In some embodiments, the method may further comprise a step of removing from the HashMap the associated URLs of the displayed disrupted content segment. Once the first time shifted content of the live stream has been shown to and consumed by the user, by launching a secondary screen such as a PIP catch-up window generated to display the catch-up video, i.e., the missed content, it is cleared from the HashMap.

In some embodiments, the PIP catch-up window and the live window are of equal size generated side-by-side. In other embodiments, the PIP catch-up window is superimposed on top of the live window, and the PIP catch-up window is smaller than the live window.

In some embodiments, the size and/or dimensions of the PIP catch-up window are adjustable automatically and/or manually.

In some embodiments, the step of generating the PIP catch-up window further comprises playing the catchup video at a catch-up playback speed equal to or greater than a playing speed of the live video. For example, a faster play speed of the catch-up video enables the media guidance application to catchup with the live point of the live media stream quicker so that the user can concentrate on the live window.

In some embodiments, the method may further comprise analyzing the disrupted content segment being displayed in the catch-up video, searching a database of importance levels based on the disrupted content segment to determine an importance level of the disrupted content segment and, in response to determining that the importance level exceeds a first importance threshold, increasing the size of the PIP catch-up window and/or decreasing the catch-up playback speed of the catch-up video. For example, the media guidance application may search a database of importance levels of media content segments (e.g., scenes of the live stream) to determine an importance level of the segment or segments of the missed content that, due to disruption, are currently being played back as part of the catch-up video.

In some embodiments, the method may further comprise searching for a mobile device associated with the user and sending the catch-up video and/or a textual summary of the catch-up video to the mobile device. This can also help the user stay up-to-date with the live action of the live content.

According to a second aspect, there is provided a system for generating a picture-in-picture (PIP) catch-up window displaying a catch-up video with a live video window displaying a live video. The system comprises means for determining that a disruption has occurred to the live video. In response to determining that the disruption has occurred to the live video, the system comprises means for initiating determining a period of disruption from the occurrence of the disruption until it is determined that the disruption has elapsed. Further, in response to determining that the period of disruption has elapsed, the system comprises means for storing a disrupted content segment of the live video that a user missed during the period of disruption. The system comprises means for generating, if not already generated, the PIP catch-up window displaying the catch-up video of the disrupted content segment for simultaneous display with the live video window displaying the live video. The system comprises means for detecting that the catch-up video has finished displaying the stored disrupted content segment and, in response to detecting that the catch-up video has finished displaying the stored disrupted content segment, means for discontinuing the generated PIP catch-up window.

According to a third aspect, there is provided a non-transitory computer-readable medium comprising non-transitory computer-readable instructions encoded thereon for generating a PIP catch-up window displaying a catch-up video with a live video window displaying a live video. The non-transitory computer-readable medium comprises instructions for determining that a disruption has occurred to the live video. In response to determining that the disruption has occurred to the live video, the non-transitory computer-readable medium initiates determining a period of disruption from the occurrence of the disruption until it is determined that the disruption has elapsed. Further, in response to determining that the period of disruption has elapsed, the non-transitory computer-readable medium initiates storing a disrupted content segment of the live video that a user missed during the period of disruption. The non-transitory computer-readable medium further comprises generating, if not already generated, the PIP catch-up window displaying the catch-up video displaying the disrupted content segment for simultaneous display with the live video window displaying the live video. The non-transitory computer-readable medium further comprises detecting that the catch-up video has finished displaying the stored disrupted content segment and, in response to detecting that the catch-up video has finished displaying the stored disrupted content segment, discontinuing the generated PIP catch-up window.

It should be noted that the systems, methods, apparatuses, and/or aspects described above may be applied to, or used in accordance with, other systems, methods, apparatuses, and/or aspects described in this disclosure.

BRIEF DESCRIPTION OF THE DRAWINGS

The above and other objects and advantages of the disclosure will be apparent upon consideration of the following detailed description, taken in conjunction with the accompanying drawings, in which reference characters refer to like parts throughout, and in which.

Figure 1:
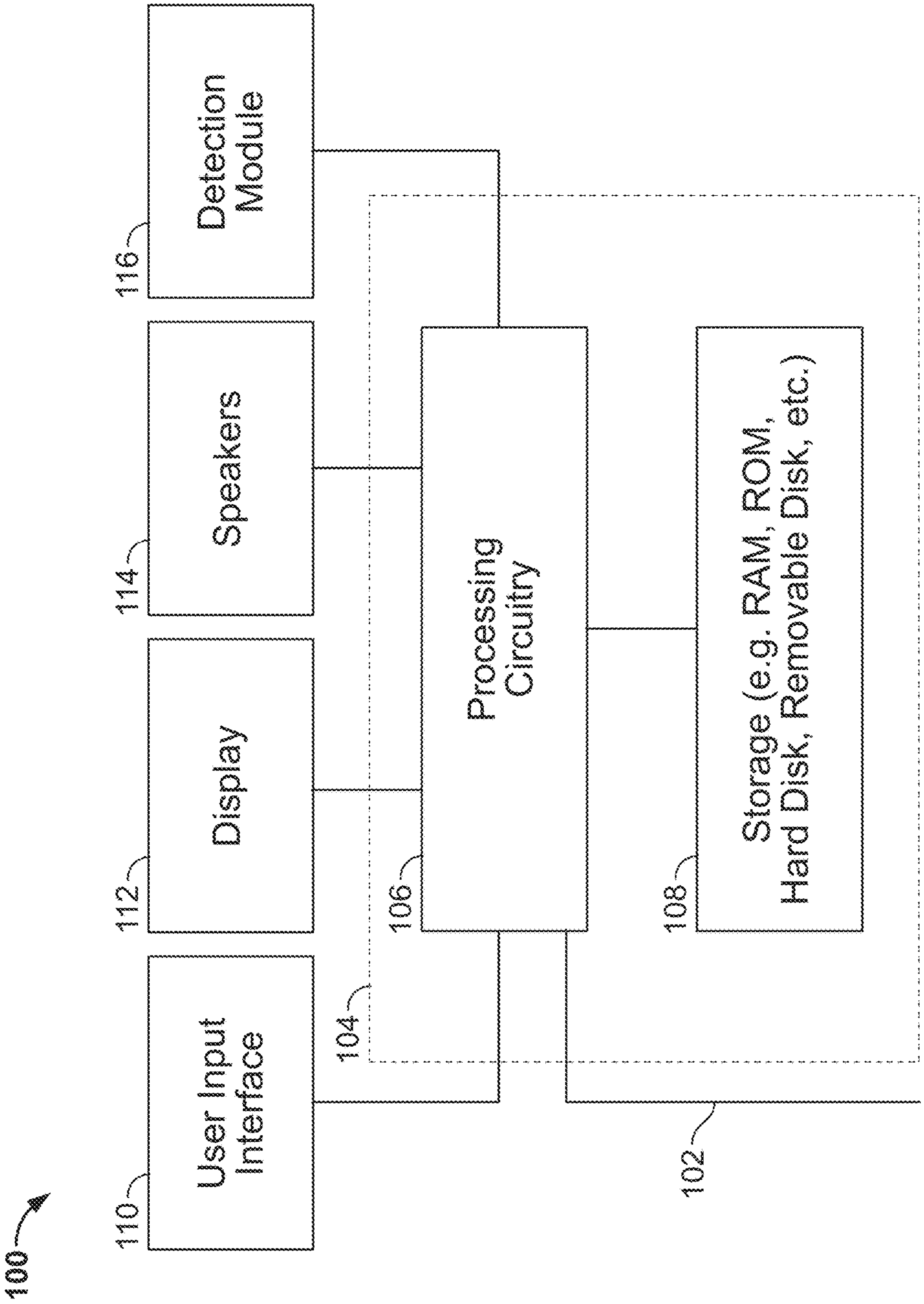
FIG. 1 shows an illustrative depiction of a user device, in accordance with some embodiments of the disclosure.

The figures herein depict various embodiments of the disclosed invention for purposes of illustration only. It will be appreciated that additional or alternative structures, systems and methods may be implemented within the principles set out by the present disclosure.

DETAILED DESCRIPTION

Methods and systems in accordance with the present disclosure are described herein for generating for display a catch-up video (e.g., a segment of a live stream stored as URLs on a local device during the time the live stream was interrupted) in a PIP window, and generating the PIP window and the live window for simultaneous display. Systems and methods described herein provide a display of the catch-up window that is configured to further provide a catch-up viewing experience that helps the user understand the content of the missed portion of the live media session.

As referred to herein, a "media guidance application" or a "guidance application" is an application that provides media guidance data to a user through an interface. For example, a media guidance application may allow users to efficiently navigate content selections and easily identify content that they may desire. The media guidance application and/or any instructions for performing any of the embodiments discussed herein may be encoded on computer-readable media. Computer-readable media includes any media capable of storing data. The computer-readable media may be transitory, including, but not limited to, propagating electrical or electromagnetic signals, or may be non-transitory including, but not limited to, volatile and nonvolatile computer memory or storage devices such as a hard disk, floppy disk, USB drive, DVD, CD, media cards, register memory, processor caches, Random Access Memory (RAM), etc.

As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

As referred to herein, the terms "media asset" and content should be understood to mean an electronically consumable user asset, such as a live televise program, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate among and locate content.

As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smartphone, or any other television equipment, computing equipment, or wireless device, and/or combination of the same.

Users may access content and the media guidance application (and its display screens described above and below) from one or more of their user equipment devices. FIG. 1 shows a generalized embodiment of illustrative user equipment device 100. More specific implementations of user equipment devices are discussed below in connection with FIG. 2. User equipment device 100 may receive content and data via input/output (hereinafter "I/O") path 102. I/O path 102 may provide content (e.g., broadcast programming, on-demand programming, Internet content, content available over a local area network (LAN) or wide area network (WAN), and/or other content) and data to control circuitry 104, which includes processing circuitry 106 and storage 108. Control circuitry 104 may be used to send and receive commands, requests, and other suitable data using I/O path 102. I/O path 102 may connect control circuitry 104 (and specifically processing circuitry 106) to one or more communications paths (described below). I/O functions may be provided by one or more of these communications paths, but are shown as a single path in FIG. 1 to avoid overcomplicating the drawing.

Control circuitry 104 may be based on any suitable processing circuitry such as processing circuitry 106. As referred to herein, processing circuitry should be understood to mean circuitry based on one or more microprocessors, microcontrollers, digital signal processors, programmable logic devices, field programmable gate arrays (FPGAs), application-specific integrated circuits (ASICs), etc., and may include a multi-core processor (e.g., dual-core, quad-core, hexacore, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 104 executes instructions for a media guidance application stored in memory (i.e., storage 108). Specifically, control circuitry 104 may be instructed by the media guidance application to perform the functions discussed above and below. For example, the media guidance application may provide instructions to control circuitry 104 to generate the media guidance displays. In some implementations, any action performed by control circuitry 104 may be based on instructions received from the media guidance application.

In client-server based embodiments, control circuitry 104 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 2). In addition, communications circuitry may include circuitry that enables peer-to-peer communication of user equipment devices, or communication of user equipment devices in locations remote from each other (described in more detail below).

Memory may be an electronic storage device provided as storage 108 that is part of control circuitry 104. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 108 may be used to store various types of content described herein as well as media guidance data described above. Nonvolatile memory may also be used (e.g., to launch a boot-up routine and other instructions). Cloud-based storage, described in relation to FIG. 2, may be used to supplement storage 108 or instead of storage 108.

Control circuitry 104 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 104 may also include scaler circuitry for upconverting and downconverting content into the preferred output format of the user equipment 100. Circuitry 104 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 108 is provided as a separate device from user equipment 100, the tuning and encoding circuitry (including multiple tuners) may be associated with storage 108.

A user may send instructions to control circuitry 104 using user input interface 110. User input interface 110 may be any suitable user interface, such as a remote control, mouse, trackball, keypad, keyboard, touch screen, touchpad, stylus input, joystick, voice recognition interface, or other user input interfaces. Display 112 may be provided as a stand-alone device or integrated with other elements of user equipment device 100. For example, display 112 may be a touchscreen or touch-sensitive display. In such circumstances, user input interface 112 may be integrated with or combined with display 112. Display 112 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images.

In some embodiments, display 112 may be HDTV-capable. In some embodiments, display 112 may be a 3D display, and the interactive media guidance application and any suitable content may be displayed in 3D. A video card or graphics card may generate the output to the display 112. The video card may offer various functions such as accelerated rendering of 3D scenes and 2D graphics, MPEG5 2/MPEG-4 decoding, TV output, or the ability to connect multiple monitors. The video card may be any processing circuitry described above in relation to control circuitry 104. The video card may be integrated with the control circuitry 104. Speakers 114 may be provided as integrated with other elements of user equipment device 100 or may be stand-alone units. The audio component of videos and other content displayed on display 112 may be played through speakers 114. In some embodiments, the audio may be distributed to a receiver (not shown), which processes and outputs the audio via speakers 114.

User equipment device 100 may also incorporate or be accessible to detection module 116. For example, detection module 116 may identify particular users and/or the movements of the particular user. For example, via detection module 116, the media guidance application may determine when a user enters and/or exits a location and/or a viewing area associated with a media asset and/or a display device. Detection module 116 may also determine the trajectory of one or more users. Detection module 116 may further include various components (e.g., a video detection component, an audio detection component, etc.).

In some embodiments, detection module 116 may include a content recognition module to determine the content of a presented media asset (e.g., whether or not an advertisement, content of interest to a user, etc.) is being presented, the number of people in a viewing area, and/or a location. The content recognition module may use object recognition techniques such as edge detection, pattern recognition, including, but not limited to, self-learning systems (e.g., neural networks), optical character recognition, online character recognition (including but not limited to, dynamic character recognition, real-time character recognition, intelligent character recognition), and/or any other suitable technique. For example, the media guidance application may receive data in the form of a video. The video may include a series of frames. For each frame of the video, the media guidance application may use a content recognition module or algorithm to determine the people (including the actions associated with each of the people) in each of the frames or series of frames and/or where each identified person is looking. Alternatively or additionally, for each frame of the video, the media guidance application may use a content recognition module or algorithm to determine the content of one or more frames of a media asset. The media guidance application may then compare the determined content to user preference information (e.g., retrieved from a user profile).

In some embodiments, the content recognition module or algorithm may also include speech recognition techniques, including but not limited to Hidden Markov Models, dynamic time warping, and/or neural networks (as described above) to translate spoken words into text and/or processing audio data. The content recognition module may also combine multiple techniques to determine the content of a presented media asset (e.g., whether or not an advertisement, content of interest to a user, etc.) is being presented, the number of people in a viewing area, and/or the level of engagement of each person in the viewing area (e.g., whether or not a person is interacting with a device). For example, a video detection component of the detection module may generate data indicating that two people are within a viewing area of a user device. An audio component of the detection module may generate data indicating that the two people are currently engaged in a conversation about the media assets (e.g., by determining and processing keywords in the conversation).

In addition, the media guidance application may use multiple types of optical character recognition and/or fuzzy logic, for example, when processing keyword(s) retrieved from data (e.g., textual data, translated audio data, user inputs, etc.) describing the engagement of a user (or when cross-referencing various types of data in databases). For example, if the particular data received is textual data, using fuzzy logic, the media guidance application (e.g., via a content recognition module or algorithm incorporated into, or accessible by, the media guidance application) may determine two fields and/or values to be identical even though the substance of the data or value (e.g., two different spellings) is not identical. In some embodiments, the media guidance application may analyze particular received data of a data structure or media asset frame for particular values or text using optical character recognition methods described above in order to determine the engagement of a user. The data received could be associated with data describing the engagement of the user and/or any other data required for the function of the embodiments described herein. Furthermore, the data could contain values (e.g., the data could be expressed in binary or any other suitable code or programming language).

In some embodiments, detection module 116 may also detect other user actions and/or movements. For example, if the media guidance application determines that a user is currently accessing another media asset on a second device, the media guidance application may determine that the user is not viewing a media asset on a first device despite being within a viewing area. However, if the content on the second device is similar (e.g., relates to the same subject matter, product, genre, etc.) to the content associated with the first device, the media guidance application may determine that the user is viewing the media asset on the first device.

Alternatively or additionally, detection module 116 may determine (e.g., via querying a device, object recognition, etc.) whether or not is interacting with a device. For example, if the user does not interact with a device for a threshold time period (e.g., a period of time representative of a user no longer interacting with a device), the media guidance application may determine that the user has stopped consuming a media asset on the device (or location associated with that device). Alternatively or additionally, detection module 116 may determine (e.g., via querying a device, object recognition, etc.) whether or not is a threshold distance from a device. For example, if the user is a threshold distance (e.g., a distance representative of a user no longer interacting with a device), the media guidance application may determine that the user has stopped consuming a media asset on the device (or location associated with that device). It should be noted that the "thresholds" described herein may be supplied by a user or may be automatically selected, or otherwise may be determined based on availability of network connection or for purposes of data transfer, for example. Automatically selected thresholds may have a default setting (e.g., determined by a third party) that may be updated based on a user's history. For example, the actual thresholds may be tailored to a particular user (e.g., a user that typically stands further away from a device when using the device may has a higher threshold distance than a user that stands closer to the device when using the device).

The media guidance application (e.g., via detection module 116) may also verify a user interest through other means. For example, the media guidance application, using a detection module (e.g., detection module 116 (FIG. 1)), may query the search history associated with a search engine accessed from a second device (e.g., a smartphone or tablet computer) being used by a user within the viewing area of the display device associated with the media guidance application. Upon detecting that the user previously searched for information similar to the information currently presented by the user device, the media guidance application may determine that the user in viewing the media asset.

In another example, the media guidance application, using a detection module (e.g., detection module 116 (FIG. 1)), may analyze keywords within a conversation between users occurring within the viewing area of a display device. If any of the keywords describe an interest in the content presented on the user device (e.g., as determined by a cross-reference with a database indicating words indicative of an interest in the content), the media guidance application may determine that the user is viewing the media asset.

The media guidance application may also receive (e.g., via detection module 116 (FIG. 1)) user-generated data (e.g., status updates, microblog posts, etc.) describing a media asset and/or advertisement generated for display by the media guidance application. For example, if a user posts an update to a social media website that he/she is currently enjoying a media asset, the media guidance application may determine the user is viewing the media asset. Likewise, if a user posts an update to a social media website that he/she is currently going home, the media guidance application may determine the trajectory of the user based on the user's home location.

As used herein, a "social network," refers to a platform that facilitates networking and/or social relations among people who, for example, share interests, activities, backgrounds, and/or real-life connections. In some cases, social networks may facilitate communication between multiple user devices (e.g., computers, televisions, smartphones, tablets, etc.) associated with different users by exchanging content from one device to another via a social media server. As used herein, a "social media server" refers to a computer server that facilitates a social network. For example, a social media server owned/operated/used by a social media provider may make content (e.g., status updates, microblog posts, images, graphic messages, etc.) associated with a first user accessible to a second user that is within the same social network as the first user.

The guidance application may be implemented using any suitable architecture. For example, it may be a stand-alone application wholly-implemented on user equipment device 100. In such an approach, instructions of the application are stored locally (e.g., in storage 108), and data for use by the application is downloaded on a periodic basis (e.g., from an out-of-band feed, from an Internet resource, or using another suitable approach). Control circuitry 104 may retrieve instructions of the application from storage 108 and process the instructions to generate any of the displays discussed herein. Based on the processed instructions, control circuitry 104 may determine what action to perform when input is received from input interface 110. For example, movement of a cursor on a display up/down may be indicated by the processed instructions when input interface 110 indicates that an up/down button was selected.

In some embodiments, the media guidance application is a client-server based application. Data for use by a thick or thin client implemented on user equipment device 100 is retrieved on-demand by issuing requests to a server remote to the user equipment device 100. In one example of a client-server based guidance application, control circuitry 104 runs a web browser that interprets web pages provided by a remote server. For example, the remote server may store the instructions for the application in a storage device. The remote server may process the stored instructions using circuitry (e.g., control circuitry 104) and generate the displays discussed above and below. The client device may receive the displays generated by the remote server and may display the content of the displays locally on equipment device 100. This way, the processing of the instructions is performed remotely by the server while the resulting displays are provided locally on equipment device 100. Equipment device 100 may receive inputs from the user via input interface 110 and transmit those inputs to the remote server for processing and generating the corresponding displays. For example, equipment device 100 may transmit a communication to the remote server indicating that an up/down button was selected via input interface 110. The remote server may process instructions in accordance with that input and generate a display of the application corresponding to the input (e.g., a display that moves a cursor up/down). The generated display is then transmitted to equipment device 100 for presentation to the user.

In some embodiments, the media guidance application is downloaded and interpreted or otherwise run by an interpreter or virtual machine (run by control circuitry 104). In some embodiments, the guidance application may be encoded in the ETV Binary Interchange Format (EBIF), received by control circuitry 104 as part of a suitable feed, and interpreted by a user agent running on control circuitry 104. For example, the guidance application may be an EBIF application. In some embodiments, the guidance application may be defined by a series of JAVA-based files that are received and run by a local virtual machine or other suitable middleware executed by control circuitry 104. In some of such embodiments (e.g., those employing MPEG-2 or other digital media encoding schemes), the guidance application may be, for example, encoded and transmitted in an MPEG-2 object carousel with the MPEG audio and video packets of a program.

Figure 2:
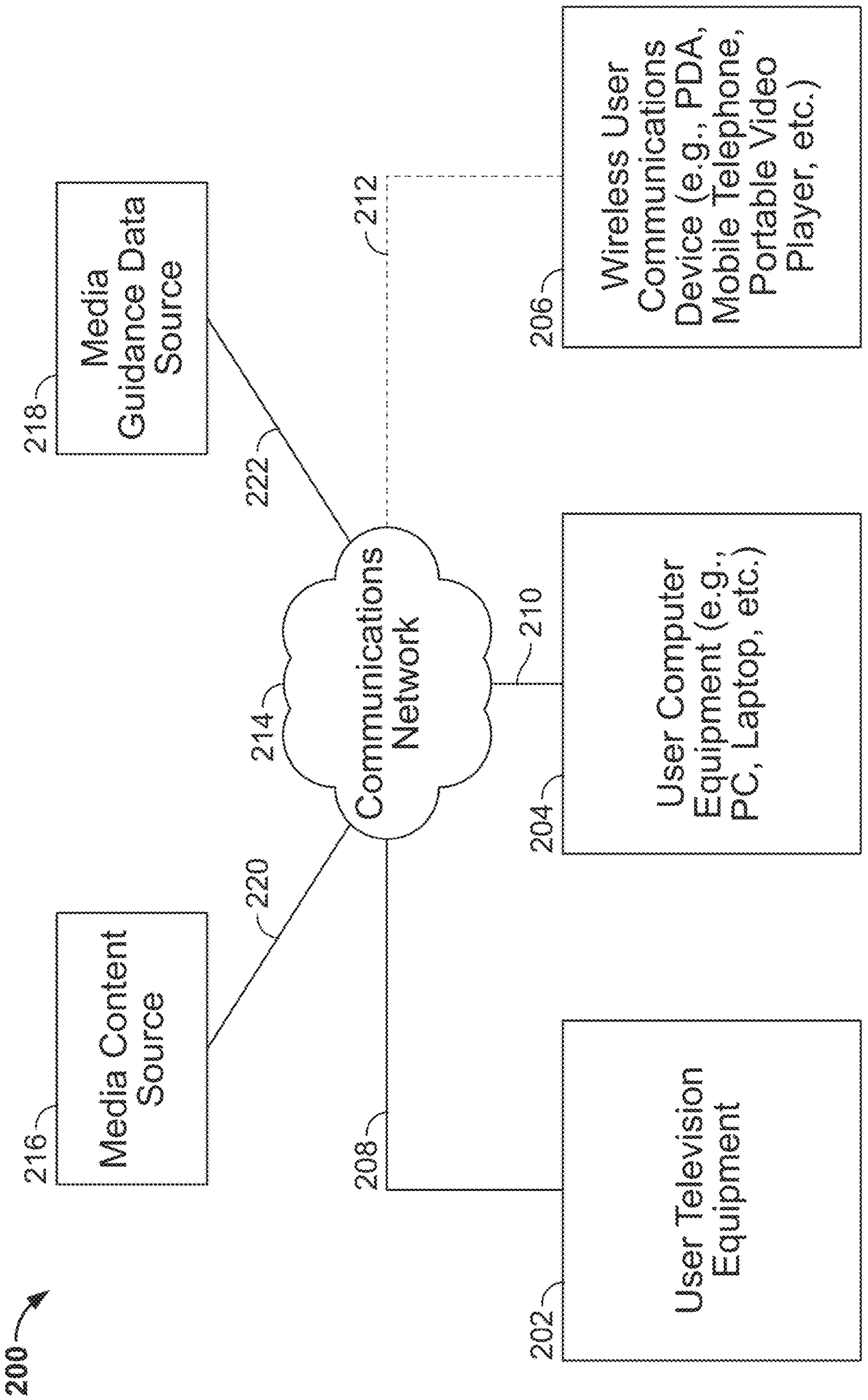
FIG. 2 is a block diagram of an illustrative user equipment system, in accordance with some embodiments of the present disclosure.

User equipment device 100 of FIG. 1 can be implemented in system 200 of FIG. 2 as user television equipment 202, user computer equipment 204, wireless user communications device 206, or any other type of user equipment suitable for accessing content, such as a nonportable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 1 may not be classified solely as user television equipment 202, user computer equipment 204, or a wireless user communications device 206. For example, user television equipment 202 may, like some user computer equipment 204, be Internet-enabled allowing for access to Internet content, while user computer equipment 204 may, like some television equipment 202, include a tuner allowing for access to television programming. The media guidance application may have the same layout on various different types of user equipment or may be tailored to the display capabilities of the user equipment. For example, on user computer equipment 204, the guidance application may be provided as a web site accessed by a web browser. In another example, the guidance application may be scaled down for wireless user communications devices 206.

In system 200, there is typically more than one of each type of user equipment device but only one of each is shown in FIG. 2 to avoid overcomplicating the drawing. In addition, each user may utilize more than one type of user equipment device and also more than one of each type of user equipment device. In some embodiments, a user equipment device (e.g., user television equipment 202, user computer equipment 204, wireless user communications device 206) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

In example embodiments, each user may utilize or may authenticated access to more than one type of user equipment device and also more than one of each type of user equipment device. In example embodiments, a user equipment device (e.g., user television equipment 202, user computer equipment 204, wireless user communications device 206) may alternatively be referred to as a "second device". The second device 406 being the user device on which a media asset is sought to be continued.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 214. Namely, user television equipment 202, user computer equipment 204, and wireless user communications device 206 are coupled to communications network 214 via communications paths 208, 210, and 212, respectively. Communications network 214 may be one or more networks including the Internet, a mobile phone network, mobile voice or data network (e.g., a 4G or LTE network), cable network, public switched telephone network, or other types of communications network or combinations of communications networks. Paths 208, 210, and 212 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 212 is drawn with dotted lines to indicate that in the exemplary embodiment shown in FIG. 2 it is a wireless path and paths 208 and 210 are drawn as solid lines to indicate they are wired paths (although these paths may be wireless paths, if desired). Communications with the user equipment devices may be provided by one or more of these communications paths, but are shown as a single path in FIG. 2 to avoid overcomplicating the drawing.

Although communications paths are not drawn between user equipment devices, these devices may communicate directly with each other via communication paths, such as those described above in connection with paths 208, 210, and 212, as well as other short-range point-to-point communication paths, such as USB cables, IEEE 1394 cables, wireless paths (e.g., Bluetooth, infrared, IEEE 702-11x, etc.), or other short-range communication via wired or wireless paths. BLUETOOTH is a certification mark owned by Bluetooth SIG, INC. The user equipment devices may also communicate with each other directly through an indirect path via communications network 214.

System 200 includes content source 216 and media guidance data source 218 coupled to communications network 214 via communication paths 220 and 222, respectively. Paths 220 and 222 may include any of the communication paths described above in connection with paths 208, 210, and 212. Communications with the content source 216 and media guidance data source 218 may be exchanged over one or more communications paths, but are shown as a single path in FIG. 2 to avoid overcomplicating the drawing. In addition, there may be more than one of each of content source 216 and media guidance data source 218, but only one of each is shown in FIG. 2 to avoid overcomplicating the drawing. (The different types of each of these sources are discussed below.) If desired, content source 216 and media guidance data source 218 may be integrated as one source device. Although communications between sources 216 and 218 with user equipment devices 202, 204, and 206 are shown as through communications network 214, in some embodiments, sources 216 and 218 may communicate directly with user equipment devices 202, 204, and 206 via communication paths (not shown) such as those described above in connection with paths 208, 210, and 212.

Content source 216 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 216 may be the originator of content (e.g., a television broadcaster, a Webcast provider, etc.) or may not be the originator of content (e.g., an on-demand content provider, an Internet provider of content of broadcast programs for downloading, etc.). Content source 216 may include cable sources, satellite providers, on-demand providers, Internet providers, over-the-top content providers, or other providers of content. Content source 216 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 218 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 218 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 218 to obtain guidance data when needed, e.g., when the guidance data is out of date or when the user equipment device receives a request from the user to receive data.

Media guidance may be provided to the user equipment with any suitable frequency (e.g., continuously, daily, a user-specified period of time, a system-specified period of time, in response to a request from user equipment, etc.). Media guidance data source 218 may provide user equipment devices 202, 204, and 206 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year.

Media guidance applications may be, for example, stand-alone applications implemented on user equipment devices. For example, the media guidance application may be implemented as software or a set of executable instructions which may be stored in storage 108, and executed by control circuitry 104 of a user equipment device 100. In some embodiments, media guidance applications may be client-server applications where only a client application resides on the user equipment device, and server application resides on a remote server. For example, media guidance applications may be implemented partially as a client application on control circuitry 104 of user equipment device 100 and partially on a remote server as a server application (e.g., media guidance data source 218) running on control circuitry of the remote server. When executed by control circuitry of the remote server (such as media guidance data source 218), the media guidance application may instruct the control circuitry to generate the guidance application displays and transmit the generated displays to the user equipment devices. The server application may instruct the control circuitry of the media guidance data source 218 to transmit data for storage on the user equipment. The client application may instruct control circuitry of the receiving user equipment to generate the guidance application displays.

Content and/or media guidance data delivered to user equipment devices 202, 204, and 206 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. YouTube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 200 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 2.

In one approach, user equipment devices may communicate with each other within a home network. User equipment devices can communicate with each other directly via short-range point-to-point communication schemes described above, via indirect paths through a hub or other similar device provided on a home network, or via communications network 214. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. patent application Ser. No. 11/179,210, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 216 to access content. Specifically, within a home, users of user television equipment 202 and user computer equipment 204 may access the media guidance application to navigate among and locate desirable content. Users may also access the media guidance application outside of the home using wireless user communications devices 206 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 214. These cloud resources may include one or more content sources 216 and one or more media guidance data sources 218. In addition or in the alternative, the remote computing sites may include other user equipment devices, such as user television equipment 202, user computer equipment 204, and wireless user communications device 206. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 1.

Media programs, especially live broadcast programs such as sporting events, are prone to disruptions, for example, due to bandwidth issues or network connectivity. Disruptions in live streaming cause a user to miss portions of content of a live stream. Such interruptions are often not anticipated, and users are often not prepared during a live stream experience, resulting in an inability to view or review portions of the program that were missed. Live streaming, such as IPTV streaming, of media content is and has been one of the most popular types of content provided to users in modern entertainment. A major and coincidental issue with IPTV streaming is the issue of connectivity, potentially due to intermittent low network bandwidth. When it comes to live streaming, the aforementioned problems translate into major issues regarding user experience.

Traditionally, television sets used terrestrial or satellite signals to tune to a particular frequency channel to show live content to users. However, with the advent of the internet and popularity of streamers, providers stream live content directly to our internet-enabled devices through IPTV technology. However, a user may experience frustration when watching a live broadcast, e.g., while watching a soccer match. For example, as a user is watching a live soccer game, lagging that occurs during live streaming of content, e.g., if the user is forced to be stuck on the infamous loading icon for long periods of time, can cause serious frustration for the user and deprive the user of a seamless and comfortable viewing experience. On top of that, what tends to raise the user's frustration level further is the live stream to shift or jump directly to the latest frame, i.e., the live frame, supposedly to continue the user's live streaming experience of the live action but evidently causing the user to miss segments of content in the process due to period of disruption.

Current methods and systems include either (a) automatically shifting the user's viewing experience to the latest frame of the live stream and skipping everything in between the period of disruption, i.e., skipping the missed frames during the disrupted period, or (b) some methods and systems may allow the user to continue his/her user experience of the buffered portion (or cached segments) of the live content, i.e., continuing consumption of the content from where the user had left off, or in other words at the point where disruption occurred, leaving the user to lag behind the live action. Typically, however, the user would eventually skip everything and tune back to the latest frame for the core reason that no one likes to be left behind the excitement during a live stream.

Thus, there is a need for methods and systems to provide a user experience to allow the user to continue viewing the live stream, i.e., live, as well as keeping the user caught-up with the content that was missed due to lagging that occurs during live streaming.

Accordingly, to overcome these problems, systems and methods are provided herein for generating for display a catch-up video (e.g., a segment of a live stream stored as URLs on a local device during the time the live stream was interrupted) in a picture-in-picture ("PIP") window, and generating the PIP catch-up window and the live window for simultaneous display. Systems and methods described herein provide a display of the catch-up window that is configured to further provide a catch-up viewing experience that does not diminish a user's ability to understand the missed portion of the live media session.

Figure 3:
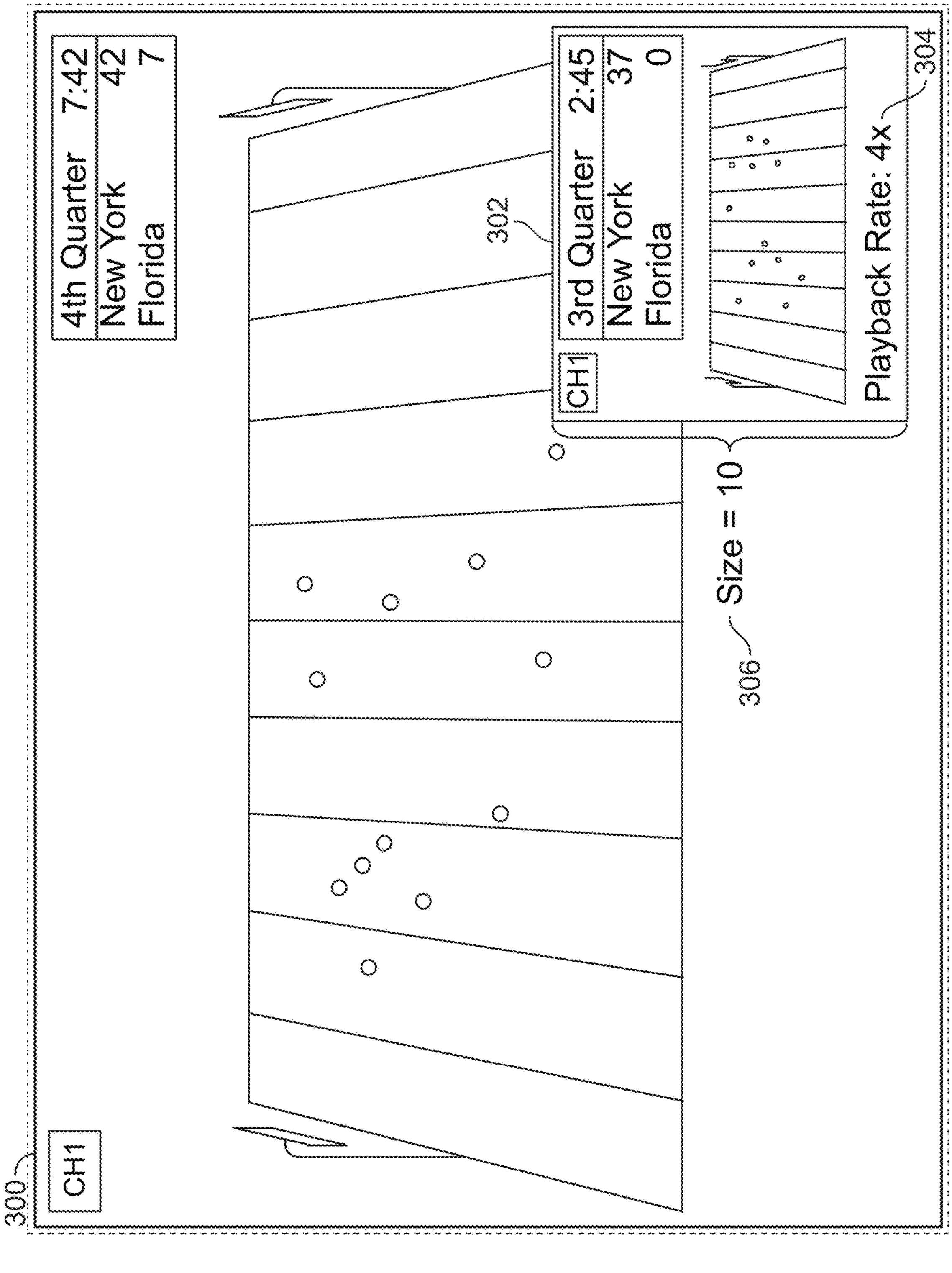
FIG. 3 shows exemplary display screens displaying a live video and a catch-up video in a PIP catch-up window, in accordance with some embodiments of the present disclosure.

FIG. 3 shows exemplary display screens displaying a live video and a catch-up video in a PIP catch-up window. Display screen 300 displays a live video, such as a sporting event. When playback of a catch-up video is initiated, processes for which are described below, a PIP catch-up window 302 may be displayed in an overlay on top of the live video, although, in some embodiments, the PIP catch-up window may be displayed as a split-screen or multi-screen experience along with the live window displaying the live video. Preferably, the PIP catch-up window overlay is positioned on display screen 300 so as to obscure the least important area of the display screen, such as a corner, for example.

In example embodiments, there are provided methods and systems for a dual-screen or multi-screen user experience during a live stream, more particularly for displaying a live stream and a catch-up video of the missed live content simultaneously, such that the user does not miss any of the live action. A media guidance application may be configured for generating the catch-up display. The media guidance application may reside on a multimedia device (e.g., a set-top box). The media guidance application may determine that a user is viewing a live media stream or program. The device, e.g., a set-top box, that the media guidance application resides on may include, e.g., the ability to detect disruption caused by network disconnection or any other lag resulting in live stream disruption. The media guidance application may use the same methods for determining if a disruption has occurred to determining if the period of disruption has elapsed. For example, the device may determine that there has been a reconnection to the network and the live stream can continue, e.g., at a shifted live stream continuing from the latest frame (i.e., the live frame).

In response to determining that the live media stream has been disrupted, e.g., due to intermittent low network bandwidth, the media guidance application may include a module that is able to store URLs corresponding to content of each disrupted content segment of the live media stream. The media guidance application may generate for simultaneous display with the live video the stored segment of the live media session in a PIP window to allow the user to view the portion of the live media session the user missed.

Figure 4:
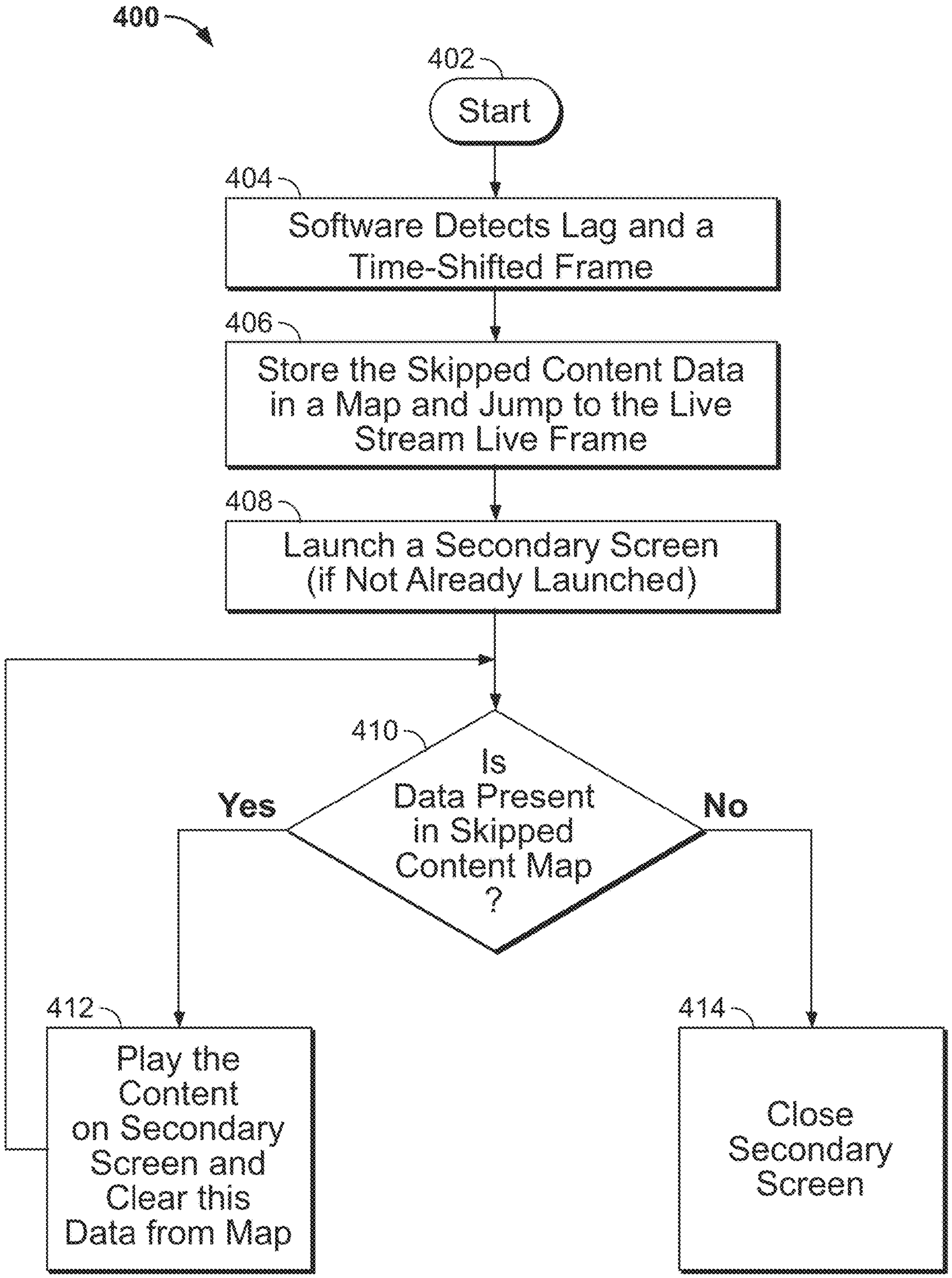
FIG. 4 is a flowchart of illustrative steps involved in generating for display a catch-up video in a PIP window, and generating the PIP catch-up window and the live window for simultaneous display.

FIG. 4 is a flowchart of illustrative steps involved in generating for display a catch-up video in a PIP window, and generating the PIP catch-up window and the live window for simultaneous display. It should be noted that process 400 or any step thereof could be performed on, or provided by, any of the devices shown in FIGS. 1-2. For example, process 400 may be executed by control circuitry 104 (FIG. 1) as instructed by a media guidance application implemented on user equipment 202, 204, and/or 206 (FIG. 2) in order to identify content providers at a device selected based on the trajectory of a user. In addition, one or more steps of process 400 may be incorporated into or combined with one or more steps of any other process or embodiment.

At step 402, the media guidance application starts (e.g., via control circuitry 104 (FIG. 1)) the process of the present method disclosed herein for generating for display a catch-up video in a PIP window, and generating the PIP catch-up window and the live window for simultaneous display.

At step 404, the media guidance application detects (e.g., via control circuitry 104 (FIG. 1)) that there is a lag resulting in time-shifted frames of the live content. Assuming that upon proper reconnection the live stream content skips to the latest frame, i.e., the live frame, there is corresponding skipped content that the user missed and that needs to be played back as part of the catch-up video in the PIP catch-up window. In example embodiments, the media guidance application may include a component or module to detect lag during user consumption of live stream content. This could be done in many ways, as would be understood by a skilled person in the art. In some embodiments, the time at which the network started to lag, i.e., the starting point of the period of disruption of the live stream or where the live stream paused due to network disconnection, for example, is set to time t=0. In some embodiments, this starting point t=0 may be set as an initial marker. The time at which the video resumed is set to t=t1, a first marker. Then the time by which the user is left behind the live frame is a first period of disruption and corresponds to a first disrupted segment of content. Every time any network bandwidth issue occurs, for example, the user is left behind the latest frame of the live stream and can lead to an accumulation of lagged periods of disruption.

In some embodiments, the determining of the period of disruption is initiated after a threshold period of time. In some situations, for example, where the period of disruption is too short, the generating of the PIP catch-up window can be annoying to the user if constantly generated and discontinued. Thus, there may be provided a threshold period of time for which a lag is classified as a disruption.

At step 406, the media guidance application stores (e.g., via control circuitry 104 (FIG. 1)) the skipped live content data in the map and jumps to the live frame of the live stream. For example, in response to determining that there has been a disruption of the live content, the media guidance application may begin storing data, e.g., URLs associated with the live video, in a local storage medium. For example, the media guidance application may have stored a plurality of segments of the live stream for catch-up corresponding to a five minute period of disruption caused by network disconnection. For example, the media guidance application may identify a first playback position of the catch-up video in the PIP window, the first playback position of the catch-up video corresponding to a starting point of a first period of disruption of the live stream. The media guidance application may further identify subsequent playback positions of the catch-up video in the PIP window, each of the subsequent playback positions of the catch-up video corresponding to a starting point of subsequent periods of disruption of the live stream.

At step 408, the media guidance application launches (e.g., via control circuitry 104 (FIG. 1)) or generates for display to the user a secondary screen, e.g., a PIP catch-up window. For example, the media guidance application may generate a PIP window 302 on display screen 300 of FIG. 3. The media guidance application may access the stored URLs corresponding to the missed segments of the live content during periods of disruption from a local storage medium. The media guidance application may process for output to the display device the video and/or audio component of the missed segments as a catch-up video for the user in order to enhance the user's viewing experience of live content. In some embodiments, the secondary PIP catch-up window may already be launched and therefore does not need to be launched again.

At step 410, the media guidance application determines (e.g., via control circuitry 104 (FIG. 1)) if there exists data in the HashMap of the media guidance application in relation to the live stream content. If so, the secondary screen presents this data to the user in parallel alongside the live stream, until there is no more of such content to be presented to the user.

At step 412, the media guidance application displays (e.g., via control circuitry 104 (FIG. 1)) for the user the next content in the PIP catch-up window as part of the catch-up video. The consumed data will be removed from the HashMap. In some embodiments, the media guidance application may discontinue generating the PIP window for display and delete the stored segment from the local storage. In some embodiments, the secondary screen, i.e., the PIP catch-up window, will play the contents of the map until there is no skipped content remaining to be consumed by the user.

At step 414, the media guidance application closes (e.g., via control circuitry 104 (FIG. 1)) the PIP catch-up window, and the user can continue to experience the live stream without having missed any content. Eventually, the goal is to catch the user's viewing experience to up with the live stream segment. Then the secondary screen will be removed, and a single screen experience of the live media content will be generated for the user, once there are no skipped frames to be presented to the user.

Figure 5:
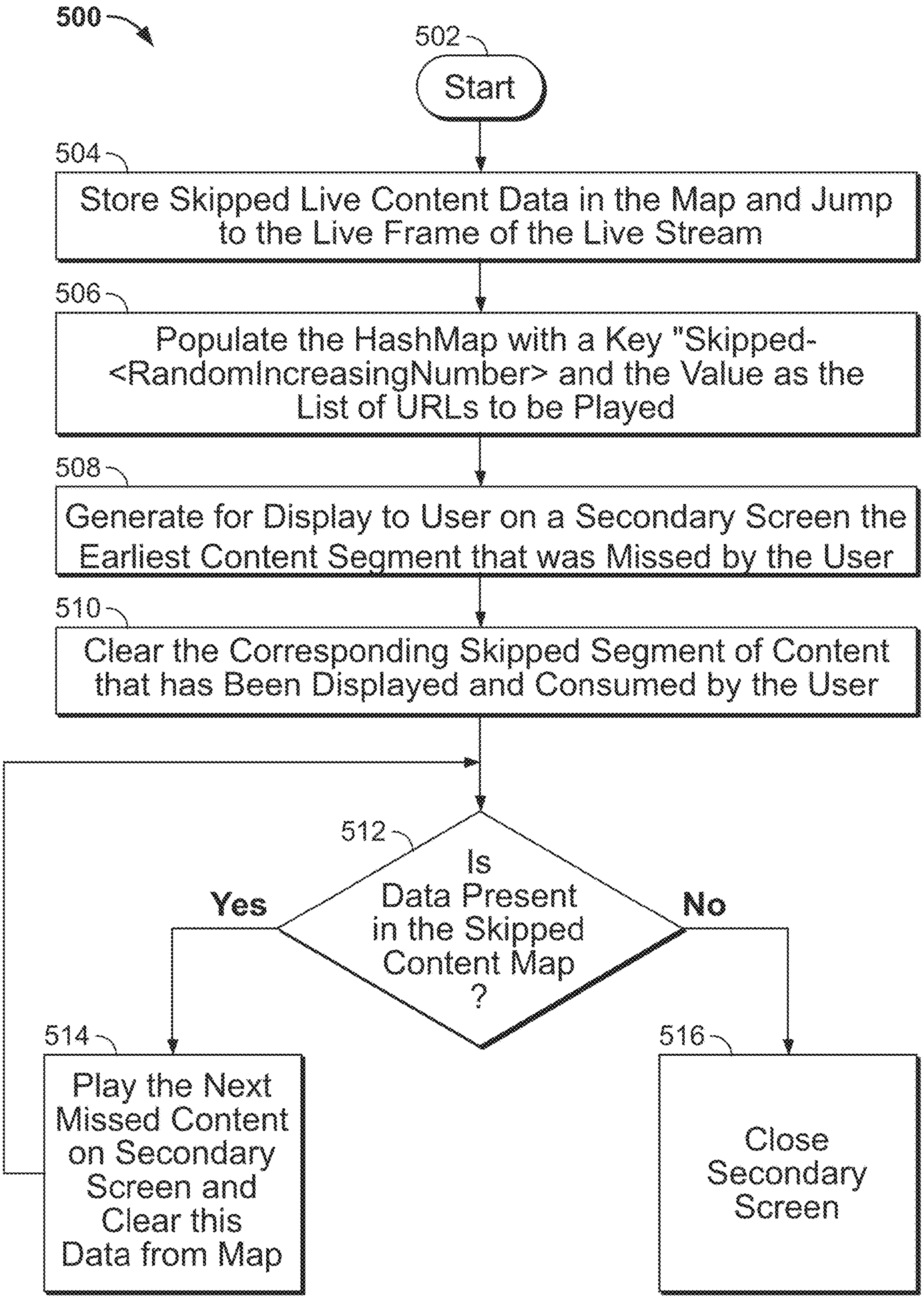
FIG. 5 is a flowchart of illustrative steps involved in storing and displaying the disrupted content segment, in accordance with some embodiments of the present disclosure.

FIG. 5 is a flowchart of illustrative steps involved in storing the skipped live content data in a HashMap. It should be noted that process 500 or any step thereof could be performed on, or provided by, any of the devices shown in FIGS. 1-2. For example, process 500 may be executed by control circuitry 104 (FIG. 1) as instructed by a media guidance application implemented on user equipment 202, 204, and/or 206 (FIG. 2) in order to identify content providers at a device selected based on the trajectory of a user. In addition, one or more steps of process 500 may be incorporated into or combined with one or more steps of any other process or embodiment.

At step 502, the media guidance application starts (e.g., via control circuitry 104 (FIG. 1)) the process of the present method disclosed herein for automatically determining the distributed missed content caused by the automatic shifting to the latest live frame by the media guidance application.

At step 504, the media guidance application stores (e.g., via control circuitry 104 (FIG. 1)) the skipped live content data in the map and jumps to the live frame of the live stream. The media guidance application maintains and implements a HashMap that stores each of the missed segments of content corresponding to the aforementioned periods of disruption of the live stream. More particularly the media guidance application maintains a list of URLs to play for that particular segment. By way of example, supposing that content has been skipped due to bandwidth issues, the data including the URLs of the segments of missed live content are stored at the HashMap. All of the URLs are acquired to be played (the list of URLs may be updated in real time or substantially real time) from the frame where the live content stopped due to disruption to the frame where the live content resumed playing. This can be achieved using timestamps of both these frames and capturing all these URLs in between those timestamps.

At step 506, the media guidance application populates (e.g., via control circuitry 104 (FIG. 1)) the HashMap with a key, e.g., "Skipped-<RandomIncreasingNumber>, and the value as the list of URLs to be played. Once the media guidance application detects that a time-shifted stream, the live content skips to the latest live frame and adds the details of the skipped frames in the maintained map. Once there is a first time-shifted live stream, the HashMap may look like ("Skipped-1", [URL1, URL2, URL3, URL4, . . . ]), for example.

The media guidance application determines (e.g., via control circuitry 104 (FIG. 1)) whether any subsequent disruptions have occurred during the live streaming of the live content. At step 508, upon consecutive or subsequent time shifts in the live stream, the map will continue to populate the skipped segments of content. Once there are subsequent time shifts of the live stream, the HashMap may look like ("Skipped-1", [URL1, URL2, URL3, URL4, . . . ]), ("Skipped-2", [URL1, URL2, URL3, URL4, . . . ]), and so on.

At step 508, the media guidance application generates (e.g., via control circuitry 104 (FIG. 1)) for display to the user a secondary screen, e.g., a PIP catch-up window, the earliest content segment that was missed by the user, e.g., the disrupted content segment corresponding to the earliest disruption.

At step 510, the media guidance application clears (e.g., via control circuitry 104 (FIG. 1)) the corresponding skipped segment of content that has been displayed and consumed by the user. Once the first time-shifted content of the live stream has been shown to and consumed by the user, by launching a secondary screen such as a PIP catch-up window to display the catch-up video, i.e., the missed content, it can be cleared from the HashMap. For example, once the first time skipped live stream has been completely shown to the user, the map lists ("Skipped-2", [URL1, URL2, URL3, URL4, . . . ]) and removes the first time-shifted URLs, for example.

In example embodiments, there is provided a presentation interface that provides a dual-screen, integrated screen or multi-screen experience where the live content would always be playing up on one screen, e.g., the live window, and time-shifted (skipped) content on the other screen, e.g., the PIP catch-up window. Screen dimensions and presentation are subject to change. For example, both the screen frames could be the same size, the live stream could be playing on the whole screen and the skipped frame superimposed as a smaller screen on top of it, or both the screens could be resizable.

In some embodiments, the media guidance application may generate for display the catch-up video of the missed segment(s) in the PIP window 302 at a specific size (e.g., size 306) or, alternatively, at a size preferred by the user. In some embodiments, the media guidance application may change or adjust the size or dimensions of the PIP catch-up window automatically. Alternatively, or additionally, the user may be allowed to manually adjust the size or location of the PIP catch-up window. In some embodiments, the user may input preferences in relation to PIP catch-up window location or PIP catch-up window dimensions or size such that the user can enjoy a seamless live streaming experience personalised to the user.

In some embodiments, the media guidance application may play back the catch-up segment at a playback rate faster than a rate at which the live video is playing. For example, as depicted in FIG. 3 element 304, the playback rate may be 4× (e.g., four times faster than the standard play speed that is the playback speed of the live video). It should be noted that another suitable playback rate may be used, e.g., 1.4×, 1.2×, or another suitable playback rate, e.g., at a playback rate preferred by the user. The faster play speed enables the media guidance application to catchup with the live point of the live media stream or media asset.

For example, if the measured period of disruption is five minutes, the media guidance application may set the initial playback rate at 1.2×, only slightly faster than the normal playback rate of the live stream, due to the short length of time that the user was disrupted from viewing the live stream. If, however, the measured period of disruption is fifteen minutes, the media guidance application may set the initial playback rate at 2×, twice the normal speed, so as to decrease the time required to catch-up with the missed segments of the live stream so that the user can focus on the latest frames of the live streams having viewed the catch-up video.

In some embodiments, the media guidance application may decrease the playback rate of the catch-up video to allow for better viewing of scenes, e.g., if the importance level exceeds a first threshold. For example, the media guidance application may vary the playback rate of the catch-up video in the PIP window, e.g., based on the content of the catch-up video.

In some embodiments, the media guidance application may drop certain video frames from the catch-up video, such as P-frames or B-frames in order to achieve the faster playback rate, as it would be understood by a skilled person in the art. Faster playback speeds may result in more frames being dropped, while slower playback speed may result in fewer frames being dropped. In other words, the faster playback speeds enables the media guidance application to catchup with the live frame of the live media asset at a rate faster than the slower playback rate.

For example, if the measured amount of time of the missed segment of the live content is five minutes, the media guidance application may set the initial playback rate of the catch-up video to be only slightly faster than the normal playback rate, dropping only a small number of video frames. However, if the measured amount of time of the missed segment of the live content is fifteen minutes, the media guidance application may set the initial playback rate of the catch-up video to be twice the speed of the normal playback rate, dropping a greater number of video frames.

Figure 6:
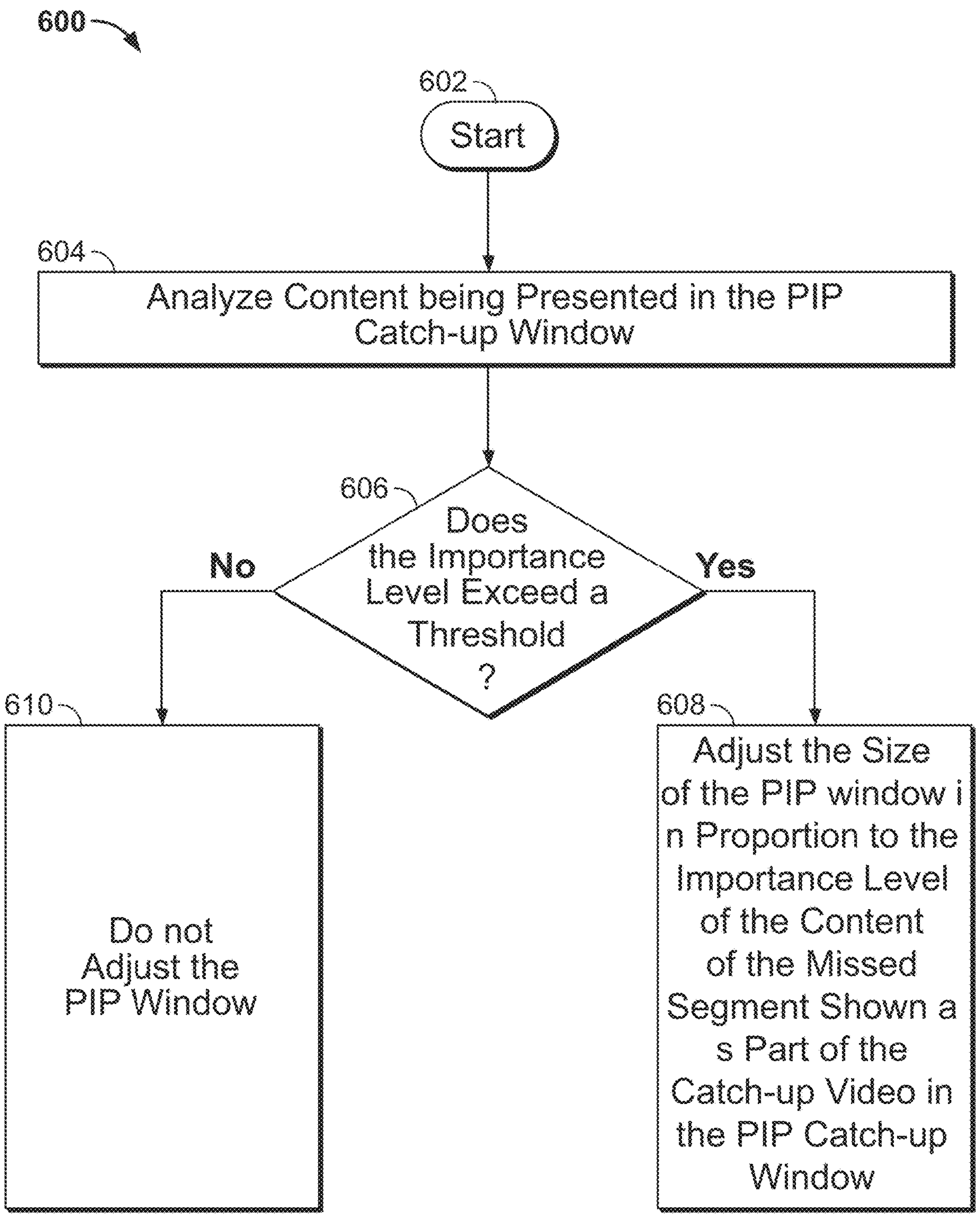
FIG. 6 is a flowchart of illustrative steps involved in analyzing the content being presented in the PIP catch-up window for adjusting the dimensions or size of the PIP catch-up window, in accordance with some embodiments of the present disclosure.

FIG. 6 is a flowchart of illustrative steps involved in analyzing the content being presented in the PIP catch-up window for adjusting the dimensions or size of the PIP catch-up window, in accordance with some embodiments of the present disclosure. It should be noted that process 600 or any step thereof could be performed on, or provided by, any of the devices shown in FIGS. 1-2. For example, process 600 may be executed by control circuitry 104 (FIG. 1) as instructed by a media guidance application implemented on user equipment 202, 204, and/or 206 (FIG. 2) in order to identify content providers at a device selected based on the trajectory of a user. In addition, one or more steps of process 600 may be incorporated into or combined with one or more steps of any other process or embodiment.

At step 602, the media guidance application starts (e.g., via control circuitry 104 (FIG. 1)) the process of the present method disclosed herein for adjusting the display of a catch-up video in a picture-in-picture ("PIP") window, or adjusting the PIP catch-up window and the live window that are generated for simultaneous display.

At step 604, the media guidance application analyzes (e.g., via control circuitry 104 (FIG. 1)) content being presented in the PIP catch-up window. For example, the media guidance application may search a database of importance levels of media content segments (e.g., scenes of the live stream) to determine an importance level of the segment or segments of the missed content due to disruption currently being played back as part of the catch-up video. In some embodiments, the media guidance application may use image recognition to determine the type of content being presented. The media guidance application may search a database of importance levels of media content segments (e.g., scenes from the live media asset or from a collection of media assets of the same or similar genre to the live content) to determine an importance level of the segment of the missed content currently being played back.

In some embodiments, the media guidance application may transmit the content of the missed segments of the live stream to a remote server for analysis. The transmission may be accomplished by, for example, a Hyper Text Transport Protocol (HTTP) POST request to the server, including video, or a link to the locally stored catch-up content. A response from the server may be received, for example, via an HTTP response, indicating whether any of the catch-up content stored at the local media device is of importance. In some embodiments, the requests may be encrypted or transmitted and received via a protocol different from HTTP.

At step 606, the media guidance application determines (e.g., via control circuitry 104 (FIG. 1)) whether the analyzed content's importance level exceeds a predetermined threshold, or any suitable threshold indicative of the content's importance.

At step 610, upon determining that the analyzed content does not exceed a threshold and is therefore not necessary to be enlarged, the media guidance application determines (e.g., via control circuitry 104 (FIG. 1)) not to alter the size of the PIP catch-up window, for example.

At step 608, the media guidance application adjusts (e.g., via control circuitry 104 (FIG. 1)) the size of the PIP in proportion to the importance level of the content of the missed segment shown as part of the catch-up video in the PIP catch-up window. For example, a very important scene of a live soccer program, e.g., a scene showing a scoring opportunity, may trigger the media guidance application to temporarily, or for the full duration of displaying the catch-up video, increase the size of the PIP window while the important scene is played back. Alternatively or additionally, the user may adjust the dimensions of the PIP catch-up window based on the user's personal preference.

Figure 7:
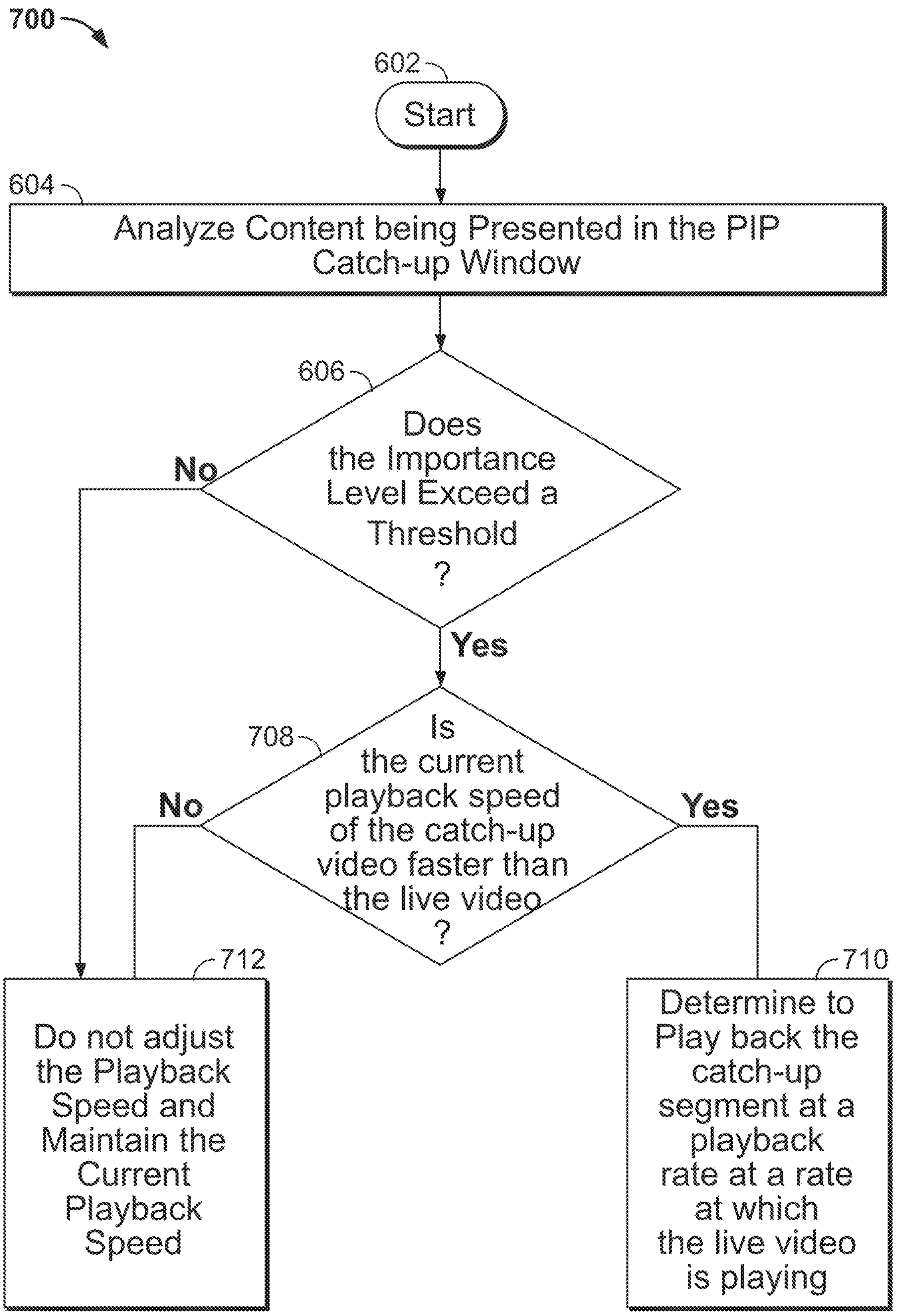
FIG. 7 is a flowchart of illustrative steps involved in analyse the content being presented in the PIP catch-up window for adjusting the playback rate of the catch-up video displayed in the PIP catch-up window, in accordance with some embodiments of the present disclosure.

FIG. 7 is a flowchart of illustrative steps involved in analyzing the content being presented in the PIP catch-up window for adjusting the playback rate of the catch-up video displayed in the PIP catch-up window, in accordance with some embodiments of the present disclosure. It should be noted that process 700 or any step thereof could be performed on, or provided by, any of the devices shown in FIGS. 1-2. For example, process 700 may be executed by control circuitry 104 (FIG. 1) as instructed by a media guidance application implemented on user equipment 202, 204, and/or 206 (FIG. 2) in order to identify content providers at a device selected based on the trajectory of a user. In addition, one or more steps of process 700 may be incorporated into or combined with one or more steps of any other process or embodiment.

Alternatively or in addition to the steps of FIG. 6, at step 710 of FIG. 7, if it has been determined that the current playback speed of the catch-up video is faster than the live video, the media guidance application can determine (e.g., via control circuitry 104 (FIG. 1)) to play back the catch-up segment at a playback rate at a rate at which the live video is playing, as shown as step 708. For example, the media guidance application may play back the media asset at 1× and the recorded segment at 1.2× or 1.5×, or another suitable speed.

At step 712, upon determining that the analyzed content does not exceed a threshold and is therefore not necessary to be slowed down for enhanced viewing experience, the media guidance application can determine (e.g., via control circuitry 104 (FIG. 1)) not to alter the playback speed of the catch-up video, for example.

In some embodiments, the media guidance application may send the audio corresponding to the catch-up video to a mobile device associated with the user. For example, the media guidance application may search for a mobile device associated with the user in, for example, in a database of user devices, or in a user profile. In some embodiments, the media guidance application may send the audio corresponding to the catch-up video to the mobile device while the audio corresponding to the live video continues to be output at the media device on which the live video is being played. In some embodiments, the media guidance application may, alternatively, send the audio and/or a textual summary corresponding to the catch-up video, or the catch-up video itself, to the mobile device, based on user preferences in staying up-to-date with the live action of the live content.

In will be appreciated that the media guidance application may perform one or more of the functions described above simultaneously.

As referred herein, the term, "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

It will be apparent to those of ordinary skill in the art that methods involved in the present invention may be embodied in a computer program product that includes a computer-usable and/or readable medium. For example, such a computer-usable medium may consist of a read-only memory device, such as a CD-ROM disk or conventional ROM device, or a random-access memory, such as a hard drive device or a computer diskette, having a computer-readable program code stored thereon. It should also be understood that methods, techniques, and processes involved in the present disclosure may be executed using processing circuitry.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods. Additionally any of the steps in said processes can be performed in any order, can be omitted, and/or can be combined with any of the steps from any other process.

While some portions of this disclosure may make reference to "convention," any such reference is merely for the purpose of providing context to the invention(s) of the instant disclosure, and does not form any admission as to what constitutes the state of the art.

What is claimed is:

1. A method comprising:
- generating a live video for output at a computing device at a first playback speed;
- determining a start point of a disruption to the live video;
- determining an end point of the disruption to the live video;
- based at least in part on the start point and the end point, identifying a content segment of the live video associated with the disruption;
- identifying a second playback speed for playing the content segment of the live video associated with the disruption, wherein the second playback speed is different from the first playback speed; and
- generating a picture in picture ("PIP") catch-up window for output, wherein the PIP catch-up window plays the content segment of the live video associated with the disruption at the second playback speed for simultaneous output with a live video window playing the live video at the first playback speed.

2. The method of claim 1, wherein the method further comprises:
- detecting that the content segment of the live video associated with the disruption has finished playing; and
- based at least in part on detecting that the content segment of the live video associated with the disruption has finished playing, discontinuing the generating the PIP catch-up window for output.

3. The method of claim 1, wherein:
- the method further comprises identifying an importance level associated with the content segment of the live video associated with the disruption; and
- identifying the second playback speed is based at least in part on the importance level.

4. The method of claim 1, wherein:
- the method further comprises:
  - identifying an importance level associated with the content segment of the live video associated with the disruption; and
  - comparing the importance level to a threshold importance level; and
- based at least in part on determining the importance level is greater than the threshold importance level, identifying the second playback speed comprises identifying the second playback speed that is less than the first playback speed.

5. The method of claim 4, wherein identifying the importance level associated with the content segment of the live video associated with the disruption comprises searching a database of importance levels.

6. The method of claim 4, wherein identifying the importance level associated with the content segment of the live video associated with the disruption comprises analyzing the content segment of the live video associated with the disruption to determine the importance level.

7. The method of claim 1, wherein identifying the second playback speed is based at least in part on a duration of the content segment of the live video associated with the disruption.

8. The method of claim 1, wherein identifying the second playback speed comprises:
- identifying a duration of the content segment of the live video associated with the disruption;
- identifying a preset catch-up time period;
- determining that the duration of the content segment of the live video associated with the disruption is longer than the preset catch-up time period; and
- identifying the second playback speed that reduces the duration of the content segment of the live video associated with the disruption to be less than the preset catch- up time period.

9. The method of claim 1, wherein:
- the second playback speed is greater than the first playback speed; and
- wherein the PIP catch-up window playing the content segment of the live video associated with the disruption at the second playback speed comprises dropping a plurality of frames of the content segment.

10. The method of claim 1, wherein:

the method further comprises:

initiating, based at least in part on determining the start point of the disruption to the live video, storing data associated with the live video;

terminating, based at least in part on determining the start end point of the disruption to the live video, storing data associated with the live video; and wherein, the content segment of the live video associated with the disruption is based on the stored data associated with the live video.

11. A system comprising:

input/output circuitry configured to:

generate a live video for output at a computing device at a first playback speed; and processing circuitry configured to:

determine a start point of a disruption to the live video;

determine an end point of the disruption to the live video;

based at least in part on the start point and the end point, identify a content segment of the live video associated with the disruption;

identify a second playback speed for playing the content segment of the live video associated with the disruption, wherein the second playback speed is different from the first playback speed; and generate a picture in picture ("PIP") catch-up window for output, wherein the PIP catch-up window plays the content segment of the live video associated with the disruption at the second playback speed for simultaneous output with a live video window playing the live video at the first playback speed.

12. The system of claim 11, wherein the processing circuitry is further configured to:

detect that the content segment of the live video associated with the disruption has finished playing; and based at least in part on detecting that the content segment of the live video associated with the disruption has finished playing, discontinue the generating the PIP catch-up window for output.

13. The system of claim 11, wherein:

the processing circuitry is further configured to identify an importance level associated with the content segment of the live video associated with the disruption; and the processing circuitry configured to identify the second playback speed is configured to identify the second playback speed based at least in part on the importance level.

14. The system of claim 11, wherein:

the processing circuitry is further configured to:

identify an importance level associated with the content segment of the live video associated with the disruption; and compare the importance level to a threshold importance level; and where the importance level is greater than the threshold importance level, the processing circuitry configured to identify the second playback speed is configured to identify the second playback speed that is less than the first playback speed; or where the importance level is equal to or less than the threshold importance level, the processing circuitry configured to identify the second playback speed is configured to identify the second playback speed that is greater than the first playback speed.

15. The system of claim 14, wherein the processing circuitry configured to identify the importance level associated with the content segment of the live video associated with the disruption is configured to search a database of importance levels.

16. The system of claim 14, wherein the processing circuitry configured to identify the importance level associated with the content segment of the live video associated with the disruption is further configured to analyze the content segment of the live video associated with the disruption to determine the importance level.

17. The system of claim 11, wherein the processing circuitry configured to identify the second playback speed is configured to identify the second playback speed based at least in part on a duration of the content segment of the live video associated with the disruption.

18. The system of claim 11, wherein the processing circuitry configured to identify the second playback speed is configured to:

identify a duration of the content segment of the live video associated with the disruption;

identify a preset catch-up time period;

determine that the duration of the content segment of the live video associated with the disruption is longer than the preset catch-up time period; and identify the second playback speed that reduces the duration of the content segment of the live video associated with the disruption to be less than the preset catch-up time period.

19. The system of claim 11, wherein:

the second playback speed is greater than the first playback speed; and wherein the PIP catch-up window playing the content segment of the live video associated with the disruption at the second playback speed is configured to drop a plurality of frames of the content segment.

20. The system of claim 11, wherein:

the processing circuitry is further configured to:

initiate, based at least in part on determining the start point of the disruption to the live video, storing data associated with the live video;

terminate, based at least in part on determining the end point of the disruption to the live video, storing data associated with the live video; and the content segment of the live video associated with the disruption is based on the stored data associated with the live video.

* * * * *